US012717504B2

(12) United States Patent
Shin et al.

(10) Patent No.: US 12,717,504 B2
(45) Date of Patent: Aug. 25, 2026

(54) MEMORY DEVICE CONFIGURATION BASED ON HOST BEHAVIOR

(71) Applicant: Micron Technology, Inc., Boise, ID (US)

(72) Inventors: Jihye Gale Shin, Palo Alto, CA (US); Kazuaki Ohara, Sunnyvale, CA (US); Rachael R. Skreen, Meridian, CA (US); Soujanya Venigalla, Newark, CA (US); Rosa Maria Avila-Hernandez, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/403,458

(22) Filed: Jan. 3, 2024

(65) Prior Publication Data

US 2024/0256160 A1 Aug. 1, 2024

Related U.S. Application Data

(60) Provisional application No. 63/441,397, filed on Jan. 26, 2023.

(51) Int. Cl.
*G06F 3/06* (2006.01)

(52) U.S. Cl.
CPC ............ *G06F 3/0634* (2013.01); *G06F 3/061* (2013.01); *G06F 3/0676* (2013.01)

(58) Field of Classification Search
CPC ...... G06F 3/0634; G06F 3/061; G06F 3/0629; G06F 3/0655; G06F 3/0673; G06F 3/0679
See application file for complete search history.

(56) References Cited

U.S. PATENT DOCUMENTS 11,017,878 B1 * 5/2021 Lu .......................... G11C 17/16
11,183,260 B1 * 11/2021 Fujiwara .............. G11C 29/785
2015/0234603 A1 * 8/2015 Kitagawa ............... G11C 17/16 711/114
2016/0133310 A1 * 5/2016 Wilson ................. G11C 29/023 365/201
2019/0016337 A1 * 1/2019 Yu ....................... B60W 30/188
2019/0138442 A1 * 5/2019 Thiruvengadam ........................... G11C 11/40607
2019/0139619 A1 * 5/2019 Thiruvengadam ........................... G06F 12/0292
2019/0205030 A1 * 7/2019 Qawami .............. G11C 13/003
2020/0167087 A1 * 5/2020 Christensen .......... G06F 3/0631
2020/0310696 A1 * 10/2020 Eliash ................... G06F 3/0604
2022/0075541 A1 * 3/2022 Kwon ................... G06F 3/0659

(Continued)

FOREIGN PATENT DOCUMENTS

WO WO-2021243700 A1 * 12/2021 ........... G06F 3/0604

*Primary Examiner* — Tracy A Warren
(74) *Attorney, Agent, or Firm* — Holland & Hart LLP

(57) ABSTRACT

Methods, systems, and devices for memory device configuration based on host behavior are described. A first memory die of multiple memory dies in a memory device may be programmed to have a first characteristic associated with a first set of performance criteria. Based on programming the first memory die to have the first characteristic, data associated with the first set of performance criteria may be received. Based on the data being associated with the first set of performance criteria, the data may be stored in the first memory die based on the first memory die having the first characteristics associated with the first set of performance criteria.

20 Claims, 8 Drawing Sheets

(56) References Cited

U.S. PATENT DOCUMENTS

2023/0126523 A1* 4/2023 Wu ....................... G06F 3/0673
711/154
2023/0307054 A1* 9/2023 Manwani ........... G11C 16/0483

* cited by examiner

300

500

MEMORY DEVICE CONFIGURATION BASED ON HOST BEHAVIOR

CROSS REFERENCE

The present application for patent claims priority to U.S. Patent Application No. 63/441,397 by Shin et al., entitled "MEMORY DEVICE CONFIGURATION BASED ON HOST BEHAVIOR," filed Jan. 26, 2023, which is assigned to the assignee hereof, and which is expressly incorporated by reference in its entirety herein.

TECHNICAL FIELD

The following relates to one or more systems for memory, including memory device configuration based on host behavior.

BACKGROUND

Memory devices are widely used to store information in various electronic devices such as computers, user devices, wireless communication devices, cameras, digital displays, automotive application (e.g., advanced driver assistance systems, infotainment systems, telematics, power trains, etc.), and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A memory system may be used to support data processing and storage for one or more applications at a device. In some examples, the processing and storage load of an application or device may change over time. For example, a vehicle may have a first processing and storage load while in an autonomous driving mode and a second, lower processing and storage load while in a standby (e.g., summon) mode. In some examples, the memory system may include a single memory device, where the single memory device may be configured for a particular use case (e.g., a nominal performance use case). Alternatively, the memory system may include multiple memory devices, where a first memory device may be configured for a first use case (e.g., a nominal performance use case) and a second memory device may be configured for a second use case (e.g., a low-power use case).

If a memory system includes a single memory device, a device or application may be coupled with a memory device that sacrifices performance in one area (e.g., power consumption) to satisfy another performance in another area (e.g., latency for accessing information). Additionally, if the memory system includes multiple memory devices, the cost or complexity associated with the device may be significantly increased—e.g., because two separate memory devices may cost more than a single memory device, because the memory system may be configured with different interfaces to access the different memory devices, and the like. Thus, a single, versatile memory device that is capable of performing at a high level across multiple areas of operation may be desired.

To provide a single memory device that is capable of high-performance in multiple areas, particular memory dies of the memory device may be accessed based on individual characteristics of the memory dies, a program accessing the memory device, information received from a host device, or an operating behavior of the host device. The individual characteristics of the memory dies may be based on modifying respective parameters (e.g., trim parameters) for the memory dies or based on variations in a manufacturing process for the memory dies.

Figure 1:
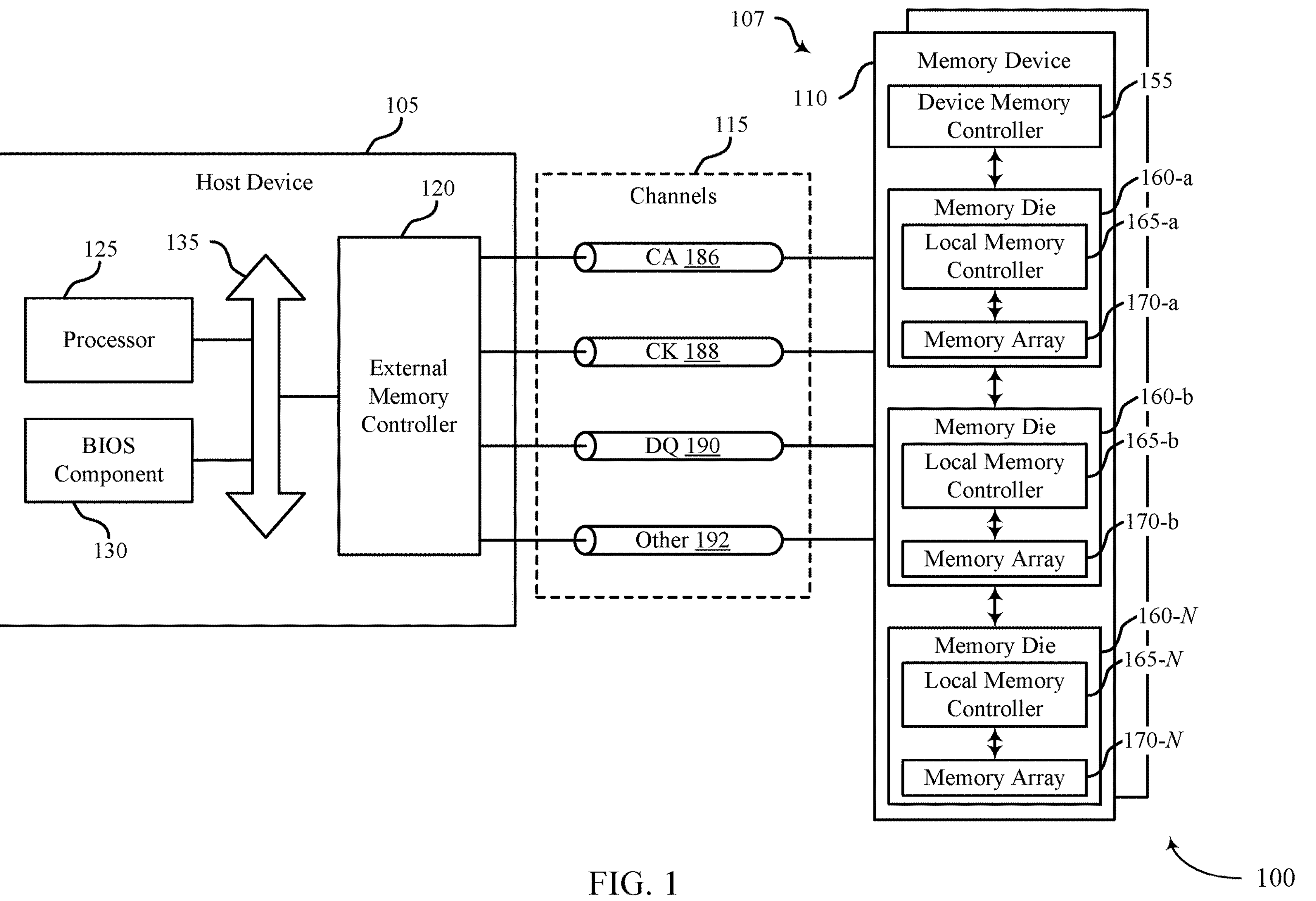
FIG. 1 illustrates an example of a system that supports memory device configuration based on host behavior in accordance with examples as disclosed herein.

FIG. 1 illustrates an example of a system 100 that supports memory device configuration based on host behavior in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device (such as the memory device 110) may include one or more memory dies (e.g., the memory dies 160). In some examples, after a memory device is manufactured, a testing procedure (e.g., performed by the memory device 110 or the host device 105) may be used to determine the capabilities of the memory device. For example, the testing procedure may be used to identify a total and individual current draw of each memory die in the memory device at different times (e.g., while in a standby state, during a refresh operation, during an activate operation, etc.). The testing procedure may also be used to identify a speed of an oscillator (e.g., a ring oscillator) in each memory die. In some examples, a device may be categorized (e.g. by the manufacturer) into a particular product tier based on the results of the testing procedure. For example, a memory device with memory dies that each have oscillator speeds that exceed a threshold may be categorized as a high-performance memory device. Also, a memory device with memory dies that each have current draws during standby operation that are below a threshold may be categorized as a low-power memory device. In some cases, a categorization of a memory device is based on a lowest-performance memory die for a particular purpose. For example, a memory device may be categorized as a standard-performance memory device if a single memory die has an oscillator speed that is below a high-performance threshold, even if all of the other memory dies have oscillator speeds that exceed the high-performance threshold. Similarly, a memory device may be categorized as a standard-power memory device if a single memory die has standby current draw that exceeds a low-power threshold.

The system 100 may be used to support the running of a device or application that is associated with different performance levels throughout the operation of the device or application. For example, the application may be associated with a high-performance state during which the application is used to perform a particular task (e.g., playing a video, running a video game, performing tasks to support autonomous driving, etc.). The application may be associated with a standby state during which the application is running and ready to perform a task but is not currently being used to do so. And, the application may also be associated with states in between the high-performance and standby states during which the application is used to perform the particular task or other tasks. For example, the application may be in a low-power state, a low-performance state, a high-bandwidth state, a nominal-performance state, a high-reliability state, or the like.

The memory system 107 may be selected (e.g., by a customer) to support a particular state of an application (e.g., a high-performance state, a high-bandwidth state, or a high-reliability state), particular purpose of a device (e.g., to support autonomous driving), or both. However, as described herein, the memory system 107 may be in multiple states throughout its operating life to support an application or a device. Thus, tuning the memory system 107 to operate in a single state may cause the memory system to not operate efficiently in one or more of these other states. In some examples, an overall performance of a device or application may be hindered when a memory system 107 that fails to operate efficiently in certain states is selected—e.g., when an application or device has competing demands. For example, if a high-performance memory is selected for a mobile device, the memory may be suitable for high-performance gaming but the battery life of the mobile device may be insufficient. Conversely, if a low-power memory is selected for the mobile device, a battery life of the memory device may be acceptable but a gaming performance of the mobile device may be less than desired. Similarly, a memory device that is selected for a device (e.g., a vehicle) or application (e.g., an autonomous driving application) for high-bandwidth performance (e.g., receiving a sensor/video stream) may not operate efficiently when the application performs high-reliability tasks.

In some examples, to support devices or application with competing demands, the memory system 107 may be configured with multiple memory devices (e.g., including the memory device 110) that use different memory technologies (e.g., LPDDR, HBM, DDRx, etc.). For example, if the memory system 107 is implemented in a mobile device, the memory system 107 may include a memory device configured for high-bandwidth performance (e.g., when a video is being played or streamed) and a memory device configured for low-power performance (e.g., when the mobile device is in a low-power mode). In another example, if the memory system 107 is implemented in a vehicle, the memory system 107 may include a memory device configured for high-performance (e.g., while the vehicle is in a self-driving mode) and for reduced-power consumption (e.g., when the self-driving mode is disabled, when the vehicle is in a standby mode). In another example, if the memory system 107 is implemented in a vehicle, the memory system 107 may include a memory device configured for high-bandwidth (e.g., to receive sensor/video streams) and for high-reliability performance (e.g., when the self-driving mode is enabled and the prevention of data failures is critical).

Accordingly, when the memory system 107 includes a single memory device, a device or application may be coupled with a memory device that sacrifices in one area to satisfy another area (e.g., even if the device or application rarely operates in the other area), configured with a memory device that sacrifices performance in multiple areas, or the like. Additionally, if the memory system 107 includes multiple memory devices, the cost or complexity associated with the device may be significantly increased—e.g., because two separate memory devices may cost more than a single memory device, because the memory system 107 may be configured with different interfaces to access the different memory devices, and the like. Thus, techniques and configuration that support a single memory device that is capable of performing at a high level across multiple areas of operation may be desired.

To provide a single memory device that is capable of high-performance in multiple areas, particular memory dies of the memory device may be accessed based on individual characteristics of the memory dies, a program accessing the memory device, information received from a host device, or an operating behavior of the host device. The individual characteristics of the memory dies may be based on processing variations that occur during a manufacturing process for the memory dies. Additionally, or alternatively, the individual characteristics of the memory dies may be based on modifying respective trim parameters for the memory dies.

In some examples, the memory device 110 receives, from the host device 105, first data associated with a first set of performance criteria. In some examples, the first data is associated with a first pattern for processing the data (e.g., with a latency, power consumption, data rate, access rate, etc.) that is associated with a first use case (e.g., a low-power use case). A use case may be associated with one or more performance criteria (e.g., a processing rate criteria, a power criteria, a latency criteria, a reliability criteria, a data rate criteria). The memory device 110 may store the first data using one or more memory dies based on the one or more memory dies having one or more first characteristics that are preferred for the first set of performance criteria. For example, the memory device 110 may prioritize the use of the one or more preferred memory dies over other memory dies in the memory device 110 that are preferred for a second set of performance criteria. Based on storing the first data in the one or more memory dies, the host device 105 may access (e.g., write/read) data in the one or more preferred memory dies in a manner that is consistent with the first use case. In some examples, the one or more memory dies have the one or more first characteristics as a result of processing variations during a manufacturing process. Additionally, or alternatively, the one or more memory dies may have the one or more first characteristics based on programming of internal operating parameters (e.g., trim parameters).

Subsequently, the memory device 110 may receive, from the host device 105, second data associated with a second set of performance criteria. In some examples, the second data is associated with a second pattern for processing the data (e.g., with a latency, power consumption, data rate, access rate, etc.) that is associated with a second use case (e.g., a high-performance use case). The memory device may store the second data using one or more second memory dies (or, in some examples, using the one or more first memory dies after reprogramming) based on the one or more second memory dies (or, in some examples, the one or more reprogrammed first memory dies) having one or more second characteristics that are preferred for the second set of performance criteria. For example, the memory device 110 may prioritize the use of the one or more second memory dies (or, in some examples, the one or more reprogrammed first memory dies) over other memory dies in the memory device 110 that are preferred for another set of performance criteria. Based on storing the first data in the one or more memory dies, the host device 105 may access (e.g., write/read) data in the one or more second memory dies (or, in some examples, the one or more reprogrammed first memory dies) in a manner that is consistent with the second use case. In some examples, the one or more second memory dies have the one or more second characteristics as a result of processing variations during a manufacturing process. Additionally, or alternatively, the one or more second memory dies (or, in some examples, the one or more reprogrammed first memory dies) may have the one or more second characteristics based on programming of internal operating parameters (e.g., trim parameters).

By enabling individual dies and/or ranks of a single memory to be prioritized in response to particular use cases being present, a single memory device may operate more efficiently and effectively across a wider range of use cases. Accordingly, a customer may be capable of configuring a memory system with a single memory device without making tradeoffs associated with selecting an over or under-capable memory device, designing memory systems with multiple memory devices suited for different use cases, or both. Additionally, manufacturers of memory devices may increase a memory device yield as memory devices having memory dies with disparate characteristics (though undesirable for a single use case application) may be used to support multi-use case applications.

Figure 2:
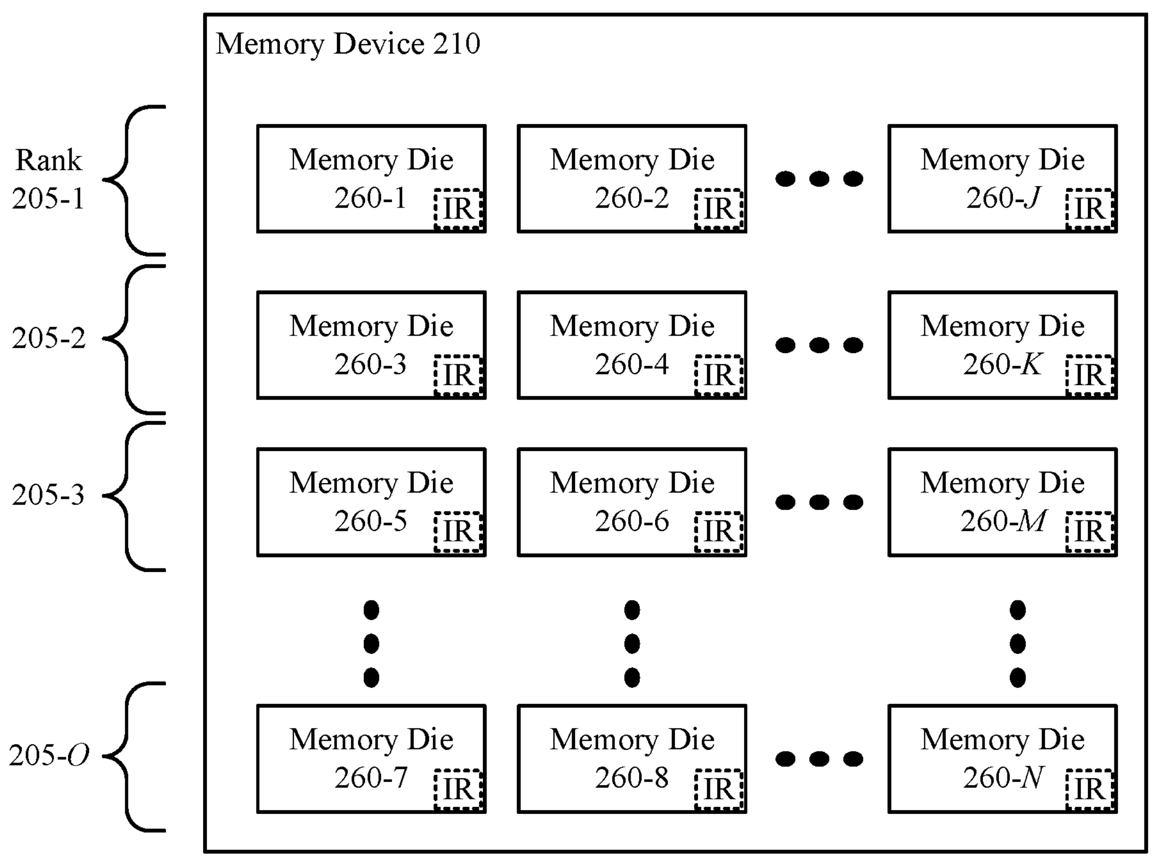
FIG. 2 illustrates an example of a versatile memory device that supports memory device configuration based on host behavior in accordance with examples as disclosed herein.

FIG. 2 illustrates an example of a versatile memory device that supports memory device configuration based on host behavior in accordance with examples as disclosed herein.

The memory device 210 may include one or more of the ranks 205 and multiple of the memory dies 260. As depicted in FIG. 2, each of the ranks 205 may include respective sets of one or more memory dies. In some examples, the memory device 210 may include a single rank (e.g., the first rank 205-1) and at least two memory dies of the first memory die 260-1 through the Jth memory die 260-J (e.g., the first memory die 260-1 and the second memory die 260-2). A memory device that includes a single rank may also be referred to as a no-rank memory device. In some examples, the memory device 210 may include multiple (e.g., two or more) ranks of the first rank 205-1 through the Oth rank 205-O. In some examples, the memory device 210 may include multiple ranks of the first rank 205-1 through the Oth rank 205-O, where each rank may include a single memory die.

One or more the memory dies 260 may have different characteristics relative to the other memory dies of the memory dies 260. For example, the first memory die 260-1 may have first characteristics (e.g., a power draw, an amount of internal resistance, an oscillator frequency) that are different from second characteristics of the third memory die 260-3. The characteristics of the first memory die 260-1 may be the same as (or similar to) the characteristics of the second memory die 260-2, and so on.

The different characteristics of the memory dies may be a result of variations in a process for manufacturing the memory dies. For example, minor variations in the process may cause a first memory die on a first end of a wafer to have an internal resistance, power consumption, and/or oscillator frequency that is larger than a second memory die that is adjacent to or at another end of the wafer. Accordingly, dies with different characteristics may be incorporated into a single memory device after being removed from the wafer, as revealed by a testing procedure. In some examples, the memory dies each include an internal register that indicates a type of the memory dies based on the characteristics identified for the memory die. For example, an internal register (IR) of a memory die may indicate that the memory die is a low performance memory die, a nominal performance memory die, a high performance memory die, a low-power memory die, a high bandwidth memory die, a fast memory die, a slow memory die, a power-efficient memory die, or any combination thereof. In some examples, respective values for the internal registers of the memory dies 260 are stored in fuses, where the values may be loaded into the internal registers during a fuse broadcast sequence. Additionally, or alternatively, fuses within the memory dies may be programmed with respective values for the internal registers of the memory dies 260.

Additionally, or alternatively, the different characteristics of the memory dies may be a result of internally configured trim parameters at the memory dies. For example, internal latches may be programmed (e.g., at the direction of a host controller or memory controller) to modify internal voltages, delays, and frequencies within a memory die to modify the characteristics of the memory die. Operations for configuring the trim parameters of the memory dies are described in more detail herein, including with reference to FIGS. 3 and 4.

The ranks 205 of the memory device may be configured to include respective memory dies that share common characteristics. For example, the memory dies within the first rank 205-1 may have characteristics that are associated with nominal performance capabilities, the memory dies within the second rank 205-2 may be associated with a low power consumption during standby operation, the memory dies within the third rank 205-3 may be associated with high-performance capabilities, and the memory dies within the Oth rank 205-O may be associated with low power consumption during active operation. In some examples, the memory device configures internal parameters of the memory dies so that the memory dies within a rank have similar characteristics suited for a particular use case. In other examples, the memory device is configured (e.g., by a physical layout procedure) so that a rank includes memory dies that are identified as having similar characteristics (e.g., during a testing procedure).

A particular use case may be associated with one or more performance criteria. For example, a particular use case may be associated with a power threshold, a processing rate threshold, a latency threshold, a reliability threshold, a data rate threshold, or any combination thereof. For example, a high-performance use case may be associated with a memory device that is able to support data processing that exceeds a processing rate threshold and a latency that satisfies a latency threshold. In another example, a low-power use case may be associated with a memory device that uses an amount of power that is below the power threshold. In yet another example, a high-bandwidth use case may be associated with a memory device that is able to achieve data transfer rates that exceed the data rate threshold. In an additional example, a nominal use case may be associated with a memory device that is able to achieve data processing rates that are above a lower data processing limit, power consumption that is below an upper power threshold, and a data rate that is below a lower data rate threshold, and so on.

In some examples, the ranks 205 are assigned a physical index (which may be referred to as a physical rank) and a logical index (which may be referred to as a logical rank). For example, the first rank 205-1 may be the first physical rank and the second rank 205-2 may be the second physical rank. The physical rank of the first rank 205-1 and the second rank 205-2 may not change during operation of the memory device. The first logical rank may be assigned to either the first rank 205-1 or the second rank 205-2. In some examples, the first logical rank may be assigned to the second rank 205-2 based on the second rank 205-2 including memory dies that are suited for nominal performance. The second logical rank may then be assigned to the first rank 205-1.

Figure 3:
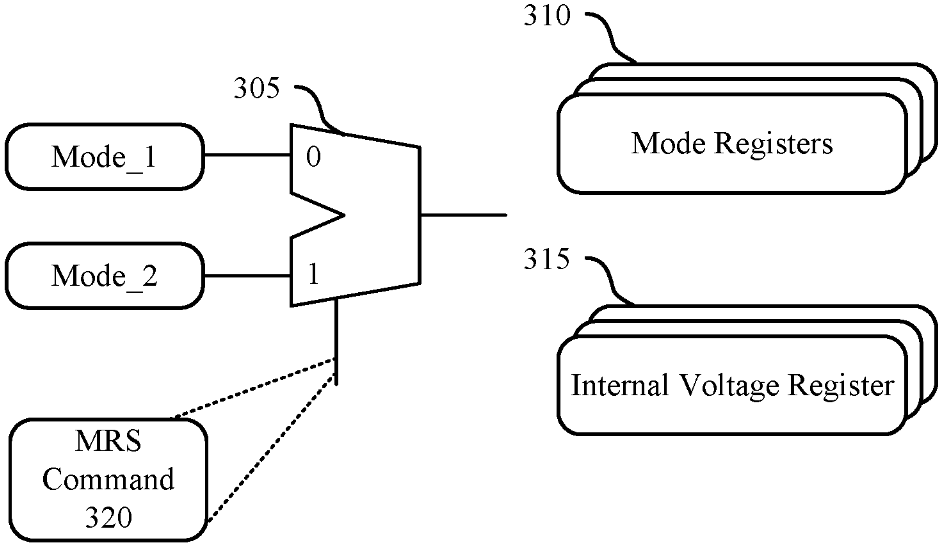
FIG. 3 illustrates an example of a mode setting component that supports memory device configuration based on host behavior in accordance with examples as disclosed herein.

FIG. 3 illustrates an example of a mode setting component that supports memory device configuration based on host behavior in accordance with examples as disclosed herein.

The mode setting component 300 may be configured to set one or more characteristics of a memory die in response to receiving a mode register command (e.g., a mode register set (MRS) command 320) from a host device. As described herein, internal trim parameters within a memory die may be modified to change one or more characteristics (internal frequency or voltage characteristics) of the memory die.

The mode setting component 300 may include the multiplexer 305 that outputs a signal indicating a first mode or a second mode based on an MRS command received at a control input node. The modes may correspond to different use cases. For example, the first mode may correspond to a low-power mode for high performance use cases and the second mode may correspond to a high power mode for power-limited use cases. By using the multiplexer 305 to indicate a particular mode, a single MRS command may be used to trigger the setting of multiple internal latches within a memory die that cause the memory die to have characteristics suited for the indicated mode.

In some examples, the MRS command 320 is used to increase a frequency of the memory die by triggering the multiplexer to indicate the first mode (associated with a high performance use case)—e.g., by configuring one or more of the mode registers 310. Additionally, or alternatively, the MRS command 320 may be used to reduce an internal voltage of the memory die by triggering the multiplexer to indicate the second mode (associated with a low-power use case)—e.g., by configuring one or more of the internal voltage registers 315. In some examples, the MRS command 320 causes multiple internal parameters at the memory die to be modified (e.g., any combination of frequency, memory timing, and voltage). In some examples, the internal latches that are modified for the memory die may be hidden from the host device that sends the MRS command 320.

Figure 4:
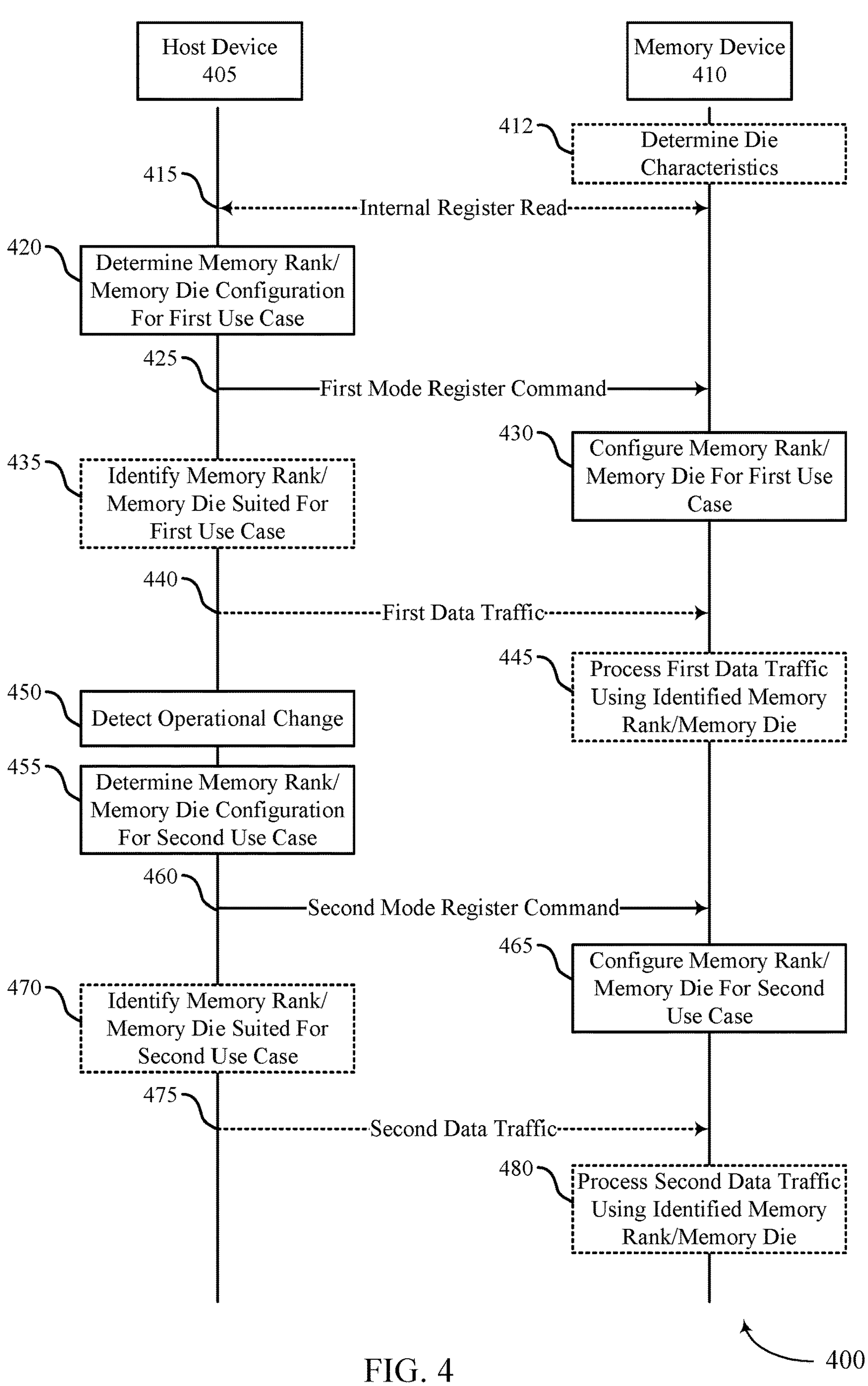
FIG. 4 illustrates an example of a set of operations for memory device configuration based on host behavior in accordance with examples as disclosed herein.

FIG. 4 illustrates an example of a set of operations for memory device configuration based on host behavior in accordance with examples as disclosed herein.

The process flow 400 may be performed by the host device 405 and the memory device 410, which may be respective examples of a host device and memory device described herein. In some examples, the process flow 400 illustrates an example set of operations performed to support memory device configuration based on host behavior. For example, the process flow 400 may include operations for identifying and using the preferred memory dies for particular use cases, where identifying the preferred memory dies may include configuring the preferred memory dies to have particular characteristics.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

The process flow 400 may depict operations of multiple methods for using preferred memory dies in the memory device 410 based on a current or upcoming use case for the host device 405. For example, the process flow 400 may depict a first method where the host device selects memory dies of the memory device 410 for data processing based on characteristics of the memory dies indicated by the memory device 410 (e.g., in internal registers of the memory dies) and a current or upcoming use case for the host device 405. In such cases, the first method may include performing at least the operations described with reference to 412, 415, 435 through 445, and 470 through 480 of the process flow 400.

In another example, the process flow 400 may depict a second method where the host device 405 indicates memory die characteristics desired by the host device 405, causing the memory device 410 to configure the memory dies to have the desired memory characteristics. In such cases, the second method may include performing at least the operations described with reference to 420 through 430 and 450 through 465 of the process flow 400.

At 412, characteristics of the memory dies within the memory device 410 may be determined. For example, an oscillator frequency, a current draw, internal resistance, etc. may be determined for the memory dies. In some examples, a testing procedure (which may be performed by the host device 405, the memory device 410, or a combination thereof) may be used to determine the characteristics of the memory dies. In some examples, the memory dies may be categorized into types based on determining the characteristics of the memory dies. For example, a value for a characteristic of a memory die may be compared with a threshold, where the memory die may be categorized as a first type based on the comparison. For instance, the memory die may be categorized as a fast memory die if the determined oscillator frequency of the memory die exceeds a threshold oscillator frequency. The memory die may be categorized as a low-power memory die if the determined current draw of the memory dies is less than a current draw threshold. And the like. Memory dies may be categorized as additional types based on a comparison of multiple characteristics of the memory dies with multiple thresholds. Internal registers of the memory dies may be programmed based on the categorization—e.g., an internal register of the fast memory die may be configured to store a value (e.g., a single-bit or multi-bit logic "1") indicating that the memory die is a fast memory die.

In some examples, instead of comparing determined characteristics of memory die against predetermined thresholds, the characteristics of the memory dies may instead be compared against one another. For example, after determining the characteristics of each of the memory dies, each memory die (e.g., a sensing circuit in the memory die) may compare values for certain of its characteristics against corresponding values of the other memory dies in the memory device 410. For example, a memory die may compare its oscillator frequency against the oscillator frequencies of the other memory dies. Based on determining a ranking of its oscillator frequency against the other oscillator frequencies, the memory die may determine its relative speed (or, in some examples, a relative speed group, such as a slow speed group, a nominal speed group, or a fast speed group). Accordingly, the memory die may program an internal register of the memory die to indicate the relative speed of the memory die compared to the other memory dies. The memory dies may similarly compare values for other characteristics (e.g., current draw) against corresponding values of the other memory dies. Storing relative characteristics may enable memory dies to be selected with higher granularity particular use case—e.g., relative to categorizing memory dies into a predetermined quantity of categories.

At 415, the internal registers of the memory dies within the memory device 410 may be read (e.g., if the memory dies include the internal registers). In some examples, the host device 405 may determine the types of memory dies included within the memory device 410 based on reading the internal registers. For example, the host device 405 may determine that a first memory die is a low-power memory die and a second memory die is a high-bandwidth memory die. In some examples, the host device 405 may determine that a first memory die includes characteristics that make it suited to use as a low-power memory die and a second memory die includes characteristics that make it suited to use as a high-bandwidth memory die. In some examples, the host device 405 may also determine the types of memory ranks included within the memory device 410—e.g., based on the internal registers of the memory dies within a respective rank, based on a register in a memory controller of the memory device 410. In some examples, the host device 405 may determine relative characteristics of the memory dies based on reading the internal registers. For example, the host device 405 may determine a ranking of the memory dies for speed, current draw; and internal resistance.

At 420, a determination of a memory rank and/or memory die configuration for a first use case may be determined—e.g., based on the first use case occurring or being scheduled to occur at the host device 405. For example, based on determining that the host device 405 is in a standby mode, the host device 405 may determine that the first, low-power memory die is better suited for memory operations that occur during the standby period. In some examples, the host device may choose to configure one or more of the memory dies to support the standby mode—e.g., if none of the memory dies currently have preferred characteristics for the standby mode. In some examples, the host device 405 may select one or more memory dies having a preferred set of relative characteristics for the first use case. For example, the host device may select one or more memory dies that have a combination of characteristics that are preferred for the first use case—e.g., the host device 405 may select the fastest of the memory dies that also has a current draw that is less than a threshold current draw.

At 425, a first mode register command may be transmitted to the memory device 410 to configure one or more memory dies to have desired characteristics for the first use case—e.g., based on the host device determining that none of the memory dies is currently preferred for the standby mode. In some examples, the first mode register command may be transmitted to the memory device 410 to configure one or more memory ranks to have desired characteristics. In some examples, the first mode register command is not transmitted to the memory device 410 when the memory devices include internal registers. In other examples, the first mode register command may be transmitted to the memory device 410 when the memory devices also include internal registers.

At 430, one or more memory dies at the memory device 410 may be configured to have characteristics associated with the received first mode register command (e.g., if the first mode register command is transmitted). In some examples, one or more memory ranks may be configured to have the characteristics associated with the received mode register command. Configuring the one or more memory dies/ranks to have the desired characteristics may include modifying trim parameters within the one or more memory dies to be better-suited for the first use case. For example, if the first use case is a standby use case, the one or more memory dies may be configured to use a reduced frequency, a lower internal voltage, a slower timing, or any combination thereof.

By using a mode register command to modify trim parameters, different performance characteristics may be programmed for memory dies during ongoing use of the memory device 410 (e.g., on-the-fly)—e.g., as opposed to configuring different performance characteristics using a fuse broadcast sequence. During a fuse broadcast sequence, a memory device may be unavailable to the host device 405 for data processing (e.g., reading/writing operations).

At 435, one or more memory dies/ranks may be identified as preferred memory dies/ranks for supporting the first use case. In some examples, the preferred memory dies/ranks are determined based on reading one or more registers at the memory device 410, as described with reference to 420. In other examples, the preferred memory dies/ranks are determined based on the host device 405 configuring the preferred memory dies/ranks to have desired characteristics for the first use case.

At 440, first data traffic may be exchanged between the host device 405 and the memory device 410, where the first data traffic may be exchanged in accordance with the first use case. For example, for a standby use case, a small amount of data traffic (e.g., less than 1 MB) may periodically be exchanged between the host device 405 and the memory device 410 at spaced intervals (e.g., every second).

At 445, the data received in the first data traffic may be processed (e.g., stored and accessed for computation) using the one or more memory dies/ranks identified by the host device 405 as preferred for the first use case. By using the identified one or more memory dies/ranks, the memory device may process the first data traffic with lower power consumption than if the other memory dies/ranks were used. In some examples, the memory device prioritizes the identified one or more memory dies/ranks for processing the first data traffic, and uses the other memory dies/ranks if the capacity of the identified one or more memory dies/ranks falls below a threshold.

At 450, an operational change at the host device 405 may be detected—e.g., the host device 405 may be woken from a standby mode, an autonomous driving or gaming application at the host device 405 may be initiated. Based on the operation change, the host device 405 may detect a second use case (e.g., a high-performance use case).

At 455, a determination of a memory die/rank configuration for the second use case may be determined—e.g., as similarly described with reference to 420.

At 460, a second mode register command may be transmitted to the memory device 410 to configure one or more memory dies to have desired characteristics for the second use case—e.g., as similarly described with reference to 425.

At 465, one or more memory dies at the memory device 410 may be configured to have characteristics associated with the received second mode register command—e.g., as similarly described with reference to 430. For example, if the second use case is a high-performance or high-bandwidth use case, the one or more memory dies may be configured to use an increased frequency, a nominal or higher internal voltage, a faster timing, or any combination thereof.

At 470, one or more memory dies/ranks may be identified as preferred memory dies/ranks for supporting the second use case—e.g., as similarly described with reference to 435.

At 475, second data traffic may be exchanged between the host device 405 and the memory device 410. The second data traffic may be exchanged in accordance with the second use case. For example, for a high-performance use cases, a large amount of data traffic (e.g., greater than 100 MB) may be continuously exchanged between the host device 405 and the memory device 410.

At 480, the data received in the second data traffic may be processed using the one or more memory dies/ranks identified by the host device 405 as preferred for the second use case.

Figure 5:
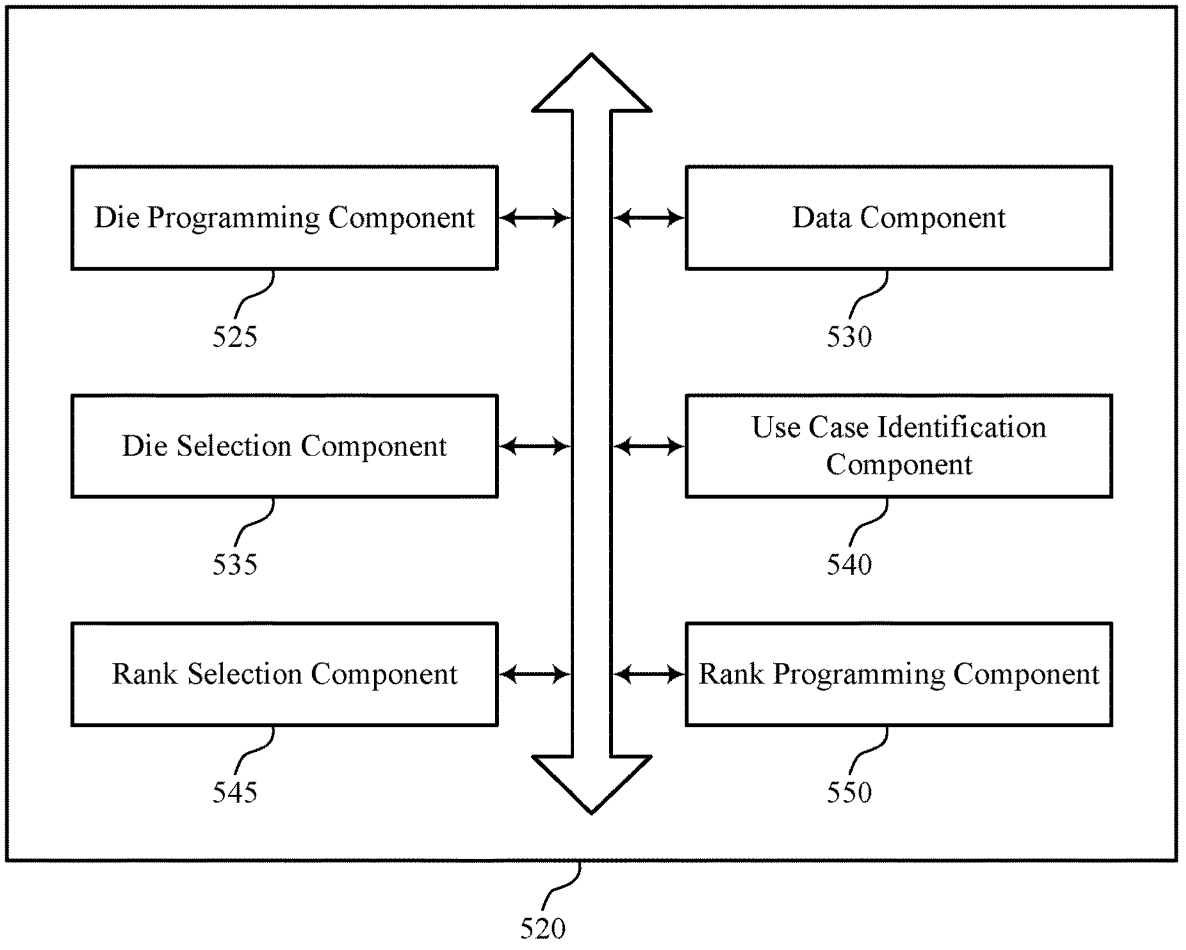
FIG. 5 illustrates a block diagram of a memory system that supports memory device configuration based on host behavior in accordance with examples as disclosed herein.

FIG. 5 illustrates a block diagram 500 of a memory system 520 that supports memory device configuration based on host behavior in accordance with examples as disclosed herein. The memory system 520 may be an example of aspects of a memory system as described with reference to FIGS. 1 through 4. The memory system 520, or various components thereof, may be an example of means for performing various aspects of memory device configuration based on host behavior as described herein. For example, the memory system 520 may include a die programming component 525, a data component 530, a die selection component 535, a use case identification component 540, a rank selection component 545, a rank programming component 550, or any combination thereof. Each of these components may communicate, directly or indirectly, with one another (e.g., via one or more buses).

The die programming component 525 may be configured as or otherwise support a means for programming a first memory die of a plurality of memory dies in a memory device to have a first characteristic associated with a first set of performance criteria. The data component 530 may be configured as or otherwise support a means for receiving, based on programming the first memory die to have the first characteristic, first data associated with the first set of performance criteria. The die selection component 535 may be configured as or otherwise support a means for storing the first data using the first memory die based on the first data being associated with the first set of performance criteria and the first memory die having the first characteristic associated with the first set of performance criteria.

In some examples, the die programming component 525 may be configured as or otherwise support a means for programming, after programming the first memory die to have the first characteristic, the first memory die to have a second characteristic associated with a second set of performance criteria. In some examples, the data component 530 may be configured as or otherwise support a means for receiving, based on programming the first memory die to have the second characteristic, second data associated with the second set of performance criteria. In some examples, the die selection component 535 may be configured as or otherwise support a means for storing the second data using the first memory die based on the second data being associated with the second set of performance criteria and the first memory die having the second characteristic associated with the second set of performance criteria.

In some examples, the die programming component 525 may be configured as or otherwise support a means for receiving, from a host device, a first request to configure the first memory die to operate in a first mode, where the first memory die is programmed to have the first characteristic based on the first request. In some examples, the die programming component 525 may be configured as or otherwise support a means for receiving, from the host device, a second request to configure the first memory die to operate in a second mode, where the first memory die is programmed to have the second characteristic based on the second request.

In some examples, the die programming component 525 may be configured as or otherwise support a means for programming, after programming the first memory die to have the first characteristic, a second memory die of the plurality of memory dies to have a second characteristic associated with a second set of performance criteria. In some examples, the data component 530 may be configured as or otherwise support a means for receiving, based on programming the second memory die to have the second characteristic, second data associated with the second set of performance criteria. In some examples, the die selection component 535 may be configured as or otherwise support a means for storing the second data using the second memory die based on the second data being associated with the second set of performance criteria and the second memory die having the second characteristic associated with the second set of performance criteria.

In some examples, the die programming component 525 may be configured as or otherwise support a means for receiving, from a host device, a first request to operate in a first mode. In some examples, the die programming component 525 may be configured as or otherwise support a means for modifying, based on the first request, first trim parameters for the first memory die, where the first memory die has the first characteristic based on modifying the first trim parameters, and the first memory die is configured to operate in the first mode within a duration for modifying the first trim parameters.

In some examples, a plurality of modes includes the first mode, the plurality of modes including a high-performance mode, a nominal-performance mode, a reduced-performance mode, a power-efficient mode, or a combination thereof.

In some examples, the die programming component 525 may be configured as or otherwise support a means for receiving, from a host device, a mode register set command indicating an operating mode. In some examples, the die programming component 525 may be configured as or otherwise support a means for modifying, in response to the mode register set command, a frequency for the first memory die to a first frequency level based on the operating mode indicated in the mode register set command, where the first memory die has the first characteristic based on modifying the frequency for the first memory die.

In some examples, the die programming component 525 may be configured as or otherwise support a means for receiving, from a host device, a mode register set command indicating an operating mode. In some examples, the die programming component 525 may be configured as or otherwise support a means for modifying, in response to the mode register set command, a supply voltage for the first memory die to a first voltage level based on the operating mode indicated in the mode register set command, where the first memory die has the first characteristic based on modifying the supply voltage for the first memory die.

In some examples, the use case identification component 540 may be configured as or otherwise support a means for determining that a host device is operating in accordance with the first set of performance criteria, where the first memory die is programmed to have the first characteristic based on the host device operating in accordance with the first set of performance criteria.

In some examples, the host device is determined as operating in accordance with the first set of performance criteria based on an operating voltage of the host device, an operating frequency of the host device, a temperature of the memory device, or any combination thereof.

In some examples, storing the first data using the first memory die comprises storing the first data using a first rank of the memory device that includes the first memory die based on the first rank being configured for the first set of performance criteria, and the rank selection component 545 may be configured as or otherwise support a means for storing second data using a second rank of the memory device that includes a second memory die of the plurality of memory dies based on the second data being associated with a second set of performance criteria and the second rank being configured for the second set of performance criteria, where the second data is associated with the second set of performance criteria.

In some examples, to support storing the second data using the second rank, the rank programming component 550 may be configured as or otherwise support a means for modifying logical ranks assigned to the first memory die and the second memory die based on the second data being associated with the second set of performance criteria, where prior to modifying the logical ranks, the first memory die includes a first physical rank and is assigned a first logical rank and the second memory die includes a second physical rank and is assigned a second logical rank that is associated with a lower priority than the first logical rank, and after modifying the logical ranks, the first memory die is assigned the second logical rank and the second memory die is assigned the first logical rank.

In some examples, the rank selection component 545 may be configured as or otherwise support a means for determining that a host device is operating in accordance with the second set of performance criteria, where the second data is stored using the second rank based on the host device operating in accordance with the second set of performance criteria.

In some examples, the first characteristic of the first memory die of the first memory die indicates that the first memory die is of a first type that is preferred for the first set of performance criteria; and the second characteristic of the second memory die indicates that the second memory die is of a second type that is preferred for the second set of performance criteria.

In some examples, a plurality of set of performance criteria includes the first set of performance criteria, the plurality of set of performance criteria including a high processing load scenario, a high bandwidth scenario, a low power scenario, a nominal processing load scenario, a reduced processing load scenario, or any combination thereof.

In some examples, the first characteristic of the first memory die is preferred for the first set of performance criteria relative to a second characteristic of a second memory die of the plurality of memory dies. In some examples, the second characteristic of the second memory die is preferred for a second set of performance criteria relative to the first characteristic of the first memory die.

In some examples, the first memory die is used to store the first data instead of a second memory die of the plurality of memory dies based on the first characteristic being preferred for the first data relative to a second characteristic, and the second memory die is used to store second data instead of the first memory die based on the second characteristic being preferred for the second data relative to the first characteristic.

Figure 6:
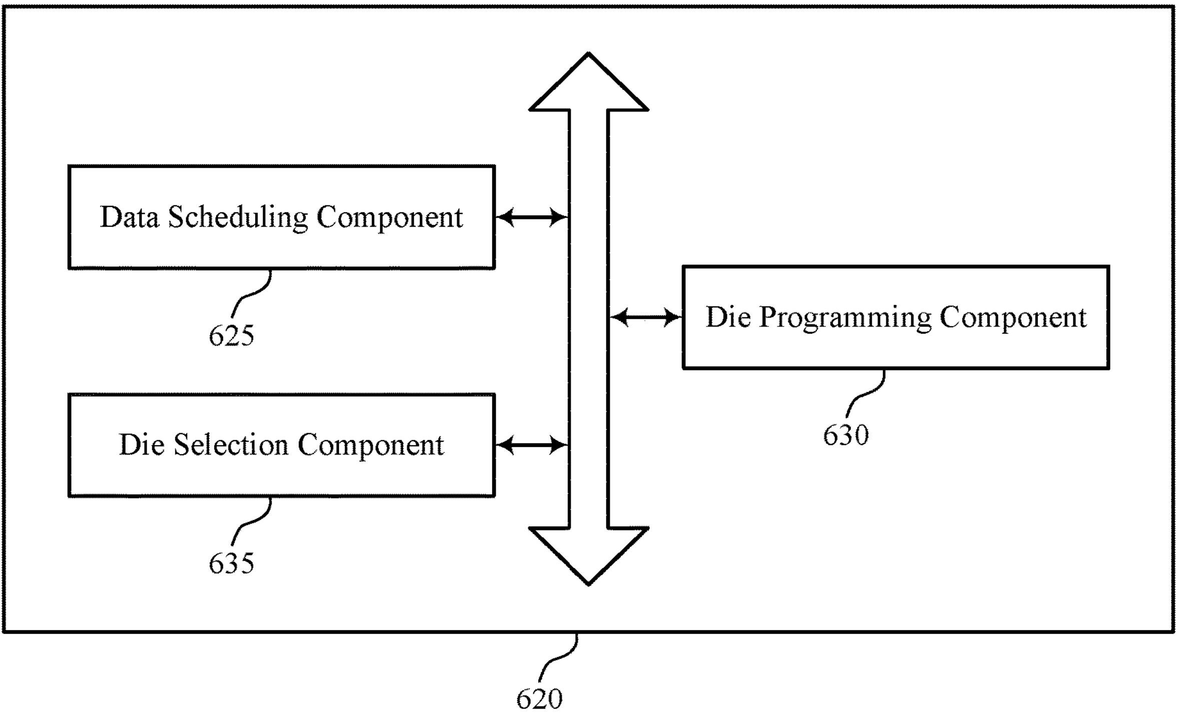
FIG. 6 illustrates a block diagram of a host device that supports memory device configuration based on host behavior in accordance with examples as disclosed herein.
Figure 6:
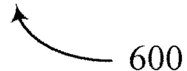

FIG. 6 illustrates a block diagram 600 of a host device 620 that supports memory device configuration based on host behavior in accordance with examples as disclosed herein. The host device 620 may be an example of aspects of a host device as described with reference to FIGS. 1 through 4. The host device 620, or various components thereof, may be an example of means for performing various aspects of memory device configuration based on host behavior as described herein. For example, the host device 620 may include a data scheduling component 625, a die programming component 630, a die selection component 635, or any combination thereof. Each of these components may communicate, directly or indirectly, with one another (e.g., via one or more buses).

The data scheduling component 625 may be configured as or otherwise support a means for determining that first data associated with a first set of performance criteria is scheduled for storage in a memory device including a plurality of memory dies. The die programming component 630 may be configured as or otherwise support a means for transmitting, to the memory device based on determining that the first data is scheduled for storage in the memory device, a request to configure a first memory die of the plurality of memory dies to operate in a first mode, where the first memory die is configured to have a first characteristic associated with the first set of performance criteria based on the request. The die selection component 635 may be configured as or otherwise support a means for storing the first data using the first memory die based on the first data being associated with the first set of performance criteria and the first memory die having the first characteristic associated with the first set of performance criteria.

In some examples, the data scheduling component 625 may be configured as or otherwise support a means for determining that second data associated with a second set of performance criteria is scheduled for storage in the memory device. In some examples, the die programming component 630 may be configured as or otherwise support a means for transmitting, to the memory device based on determining that the second data is scheduled for storage in the memory device, a second request to configure the first memory die to operate in a second mode, where the first memory die is configured to have a second characteristic associated with the second set of performance criteria based on the second request. In some examples, the die selection component 635 may be configured as or otherwise support a means for storing the second data using the first memory die based on the second data being associated with the second set of performance criteria and the first memory die having the second characteristic associated with the second set of performance criteria.

In some examples, the data scheduling component 625 may be configured as or otherwise support a means for determining that second data associated with a second set of performance criteria is scheduled for storage in the memory device. In some examples, the die programming component 630 may be configured as or otherwise support a means for transmitting, to the memory device based on determining that the second data is scheduled for storage in the memory device, a second request to configure a second memory die of the plurality of memory dies to operate in a second mode, where the second memory die is configured to have a second characteristic associated with the second set of performance criteria based on the second request. In some examples, the die selection component 635 may be configured as or otherwise support a means for storing the second data using the second memory die based on the first memory die having the second characteristic associated with the second set of performance criteria.

In some examples, the die programming component 630 may be configured as or otherwise support a means for transmitting, to the memory device, a mode register set command for setting a frequency for the first memory die to a first frequency, where the first memory die has the first characteristic based on modifying the frequency for the first memory die.

In some examples, the die programming component 630 may be configured as or otherwise support a means for transmitting, to the memory device, a mode register set command for setting a supply voltage for the first memory die to a first voltage level, where the first memory die has the first characteristic based on modifying the supply voltage for the first memory die.

Figure 7:
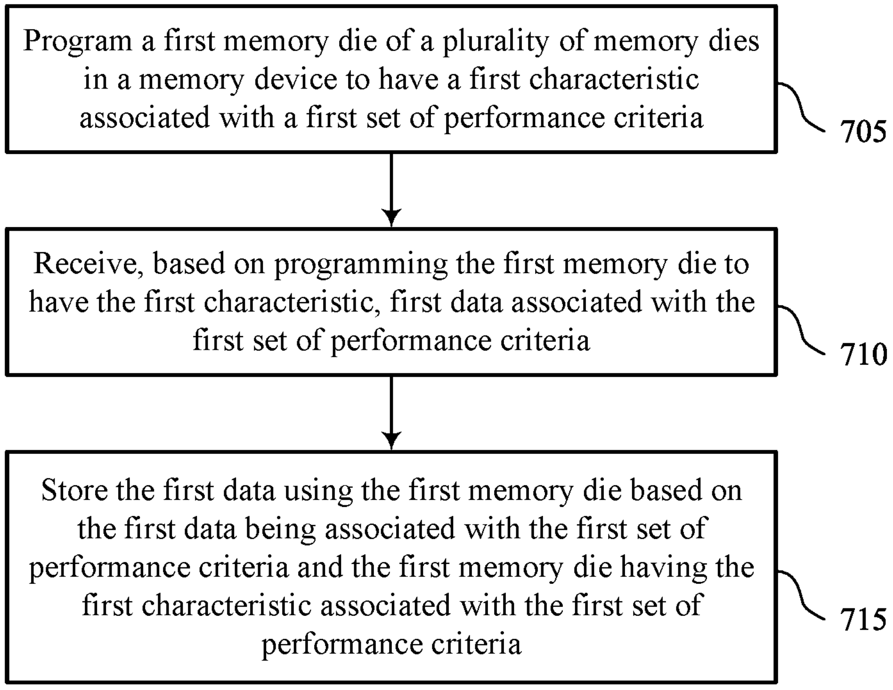
FIGS. 7 and 8 illustrate flowcharts showing a method or methods that support memory device configuration based on host behavior in accordance with examples as disclosed herein.

FIG. 7 illustrates a flowchart showing a method 700 that supports memory device configuration based on host behavior in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware. In some examples, the memory system may include or be an example of a memory device described herein (e.g., the memory device 110 of FIG. 1, the memory device 210 of FIG. 2, or the memory device 410 of FIG. 4).

At 705, the method may include programming a first memory die of a plurality of memory dies in a memory device to have a first characteristic associated with a first set of performance criteria. The operations of 705 may be performed in accordance with examples as disclosed herein. For example, the memory system may include a die programming component 525 that programs a first memory die (e.g., the first memory die 260-1 of FIG. 2) of a plurality of memory dies (e.g., the memory dies 260 of FIG. 2) in the memory device to have a first characteristic associated with a first set of performance criteria—e.g., as described herein, including with reference to the operations described at 430 of FIG. 4.

At 710, the method may include receiving, based on programming the first memory die to have the first characteristic, first data associated with the first set of performance criteria. The operations of 710 may be performed in accordance with examples as disclosed herein. For example, the memory system may include a data component 530 that receives, based on programming the first memory die to have the first characteristic, first data associated with the first set of performance criteria—e.g., as described herein, including with reference to the operations described at 440 of FIG. 4.

At 715, the method may include storing the first data using the first memory die based on the first data being associated with the first set of performance criteria and the first memory die having the first characteristic associated with the first set of performance criteria. The operations of 715 may be performed in accordance with examples as disclosed herein. For example, the memory system may include a die selection component 535 that stores the first data using the first memory die based on the first data being associated with the first set of performance criteria and the first memory die having the first characteristic associated with the first set of performance criteria—e.g., as described herein, including with reference to the operations described at 445 of FIG. 4.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for programming a first memory die of a plurality of memory dies in a memory device to have a first characteristic associated with a first set of performance criteria; receiving, based on programming the first memory die to have the first characteristic, first data associated with the first set of performance criteria; and storing the first data using the first memory die based on the first data being associated with the first set of performance criteria and the first memory die having the first characteristic associated with the first set of performance criteria.

Aspect 2: The method, apparatus, or non-transitory computer-readable medium of aspect 1, further including operations, features, circuitry, logic, means, or instructions, or any combination thereof for programming, after programming the first memory die to have the first characteristic, the first memory die to have a second characteristic associated with a second set of performance criteria; receiving, based on programming the first memory die to have the second characteristic, second data associated with the second set of performance criteria; and storing the second data using the first memory die based on the second data being associated with the second set of performance criteria and the first memory die having the second characteristic associated with the second set of performance criteria.

Aspect 3: The method, apparatus, or non-transitory computer-readable medium of aspect 2, further including operations, features, circuitry, logic, means, or instructions, or any combination thereof for receiving, from a host device, a first request to configure the first memory die to operate in a first mode, where the first memory die is programmed to have the first characteristic based on the first request and receiving, from the host device, a second request to configure the first memory die to operate in a second mode, where the first memory die is programmed to have the second characteristic based on the second request.

Aspect 4: The method, apparatus, or non-transitory computer-readable medium of any of aspects 1 through 3, further including operations, features, circuitry, logic, means, or instructions, or any combination thereof for programming, after programming the first memory die to have the first characteristic, a second memory die of the plurality of memory dies to have a second characteristic associated with a second set of performance criteria; receiving, based on programming the second memory die to have the second characteristic, second data associated with the second set of performance criteria; and storing the second data using the second memory die based on the second data being associated with the second set of performance criteria and the second memory die having the second characteristic associated with the second set of performance criteria.

Aspect 5: The method, apparatus, or non-transitory computer-readable medium of any of aspects 1 through 4, further including operations, features, circuitry, logic, means, or instructions, or any combination thereof for receiving, from a host device, a first request to operate in a first mode and modifying, based on the first request, first trim parameters for the first memory die, where the first memory die has the first characteristic based on modifying the first trim parameters, and the first memory die is configured to operate in the first mode within a duration for modifying the first trim parameters.

Aspect 6: The method, apparatus, or non-transitory computer-readable medium of aspect 5, where a plurality of modes includes the first mode, the plurality of modes including a high-performance mode, a nominal-performance mode, a reduced-performance mode, a power-efficient mode, or a combination thereof.

Aspect 7: The method, apparatus, or non-transitory computer-readable medium of any of aspects 1 through 6, further including operations, features, circuitry, logic, means, or instructions, or any combination thereof for receiving, from a host device, a mode register set command indicating an operating mode and modifying, in response to the mode register set command, a frequency for the first memory die to a first frequency level based on the operating mode indicated in the mode register set command, where the first memory die has the first characteristic based on modifying the frequency for the first memory die.

Aspect 8: The method, apparatus, or non-transitory computer-readable medium of any of aspects 1 through 7, further including operations, features, circuitry, logic, means, or instructions, or any combination thereof for receiving, from a host device, a mode register set command indicating an operating mode and modifying, in response to the mode register set command, a supply voltage for the first memory die to a first voltage level based on the operating mode indicated in the mode register set command, where the first memory die has the first characteristic based on modifying the supply voltage for the first memory die.

Aspect 9: The method, apparatus, or non-transitory computer-readable medium of any of aspects 1 through 8, further including operations, features, circuitry, logic, means, or instructions, or any combination thereof for determining that a host device is operating in accordance with the first set of performance criteria, where the first memory die is programmed to have the first characteristic based on the host device operating in accordance with the first set of performance criteria.

Aspect 10: The method, apparatus, or non-transitory computer-readable medium of aspect 9, where the host device is determined as operating in accordance with the first set of performance criteria based on an operating voltage of the host device, an operating frequency of the host device, a temperature of the memory device, or any combination thereof.

Aspect 11: The method, apparatus, or non-transitory computer-readable medium of any of aspects 1 through 10, where storing the first data using the first memory die comprises storing the first data using a first rank of the memory device that includes the first memory die based on the first rank being configured for the first set of performance criteria, and where the method, apparatuses, and non-transitory computer-readable medium further includes operations, features, circuitry, logic, means, or instructions, or any combination thereof for storing second data using a second rank of the memory device that includes a second memory die of the plurality of memory dies based on the second data being associated with a second set of performance criteria and the second rank being configured for the second set of performance criteria, where the second data is associated with the second set of performance criteria.

Aspect 12: The method, apparatus, or non-transitory computer-readable medium of aspect 11, where storing the second data using the second rank includes operations, features, circuitry, logic, means, or instructions, or any combination thereof for modifying logical ranks assigned to the first memory die and the second memory die based on the second data being associated with the second set of performance criteria, where prior to modifying the logical ranks, the first memory die includes a first physical rank and is assigned a first logical rank and the second memory die includes a second physical rank and is assigned a second logical rank that is associated with a lower priority than the first logical rank, and after modifying the logical ranks, the first memory die is assigned the second logical rank and the second memory die is assigned the first logical rank.

Aspect 13: The method, apparatus, or non-transitory computer-readable medium of any of aspects 11 through 12, further including operations, features, circuitry, logic, means, or instructions, or any combination thereof for determining that a host device is operating in accordance with the second set of performance criteria, where the second data is stored using the second rank based on the host device operating in accordance with the second set of performance criteria.

Aspect 14: The method, apparatus, or non-transitory computer-readable medium of any of aspects 1 through 13, where the first characteristic of the first memory die of the first memory die indicates that the first memory die is of a first type that is preferred for the first set of performance criteria; and the second characteristic of the second memory die indicates that the second memory die is of a second type that is preferred for the second set of performance criteria.

Aspect 15: The method, apparatus, or non-transitory computer-readable medium of any of aspects 1 through 14, where a plurality of set of performance criteria includes the first set of performance criteria, the plurality of set of performance criteria including a high processing load scenario, a high bandwidth scenario, a low power scenario, a nominal processing load scenario, a reduced processing load scenario, or any combination thereof.

Aspect 16: The method, apparatus, or non-transitory computer-readable medium of any of aspects 1 through 15, where the first characteristic of the first memory die is preferred for the first set of performance criteria relative to a second characteristic of a second memory die of the plurality of memory dies and the second characteristic of the second memory die is preferred for a second set of performance criteria relative to the first characteristic of the first memory die.

Aspect 17: The method, apparatus, or non-transitory computer-readable medium of any of aspects 1 through 16, where the first memory die is used to store the first data instead of a second memory die of the plurality of memory dies based on the first characteristic being preferred for the first data relative to a second characteristic, and the second memory die is used to store second data instead of the first memory die based on the second characteristic being preferred for the second data relative to the first characteristic.

Figure 8:
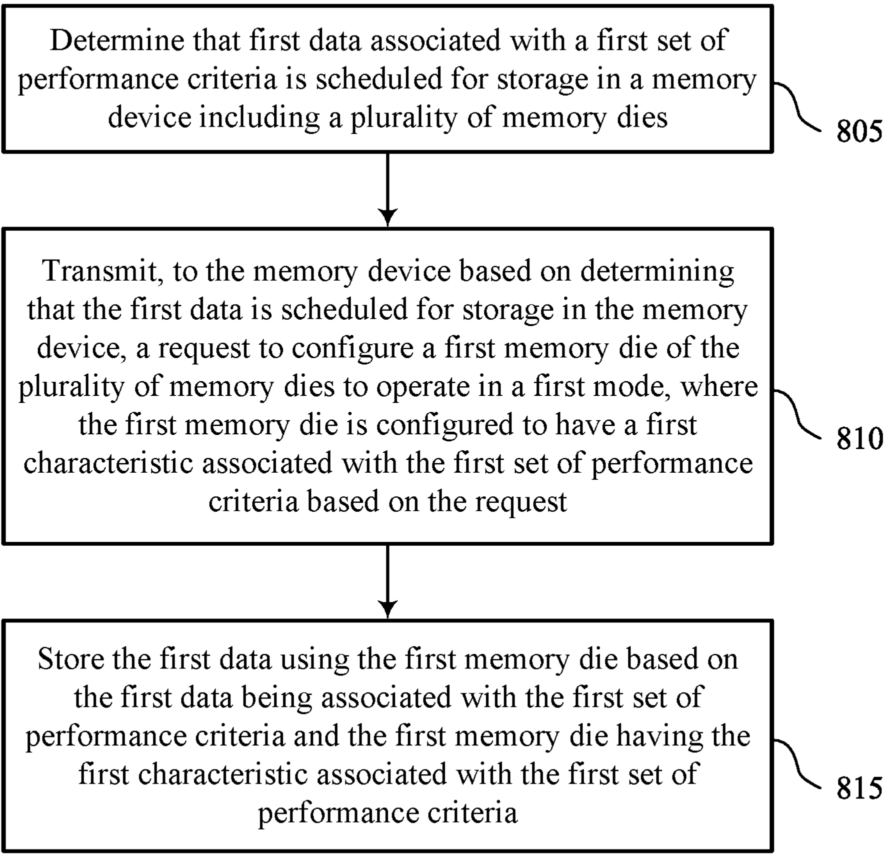

FIG. 8 illustrates a flowchart showing a method 800 that supports memory device configuration based on host behavior in accordance with examples as disclosed herein. The operations of method 800 may be implemented by a host device or its components as described herein. For example, the operations of method 800 may be performed by a host device as described with reference to FIGS. 1 through and 6. In some examples, a host device may execute a set of instructions to control the functional elements of the device to perform the described functions. Additionally, or alternatively, the host device may perform aspects of the described functions using special-purpose hardware. In some examples, the host device may include or be an example of a host device described herein (e.g., the host device 105 of FIG. 1 or the host device 405 of FIG. 4).

At 805, the method may include determining that first data associated with a first set of performance criteria is scheduled for storage in a memory device including a plurality of memory dies. The operations of 805 may be performed in accordance with examples as disclosed herein. For example, the host device may include a data scheduling component 625 that determines that first data associated with a first set of performance criteria is scheduled for storage in a memory device including a plurality of memory dies (e.g., the memory dies 260 of FIG. 2)—e.g., as described herein, including with reference to the operations described at 420 of FIG. 4.

At 810, the method may include transmitting, to the memory device based on determining that the first data is scheduled for storage in the memory device, a request to configure a first memory die of the plurality of memory dies to operate in a first mode, where the first memory die is configured to have a first characteristic associated with the first set of performance criteria based on the request. The operations of 810 may be performed in accordance with examples as disclosed herein. For example, the host device may include a die programming component 630 that transmits, to the memory device based on determining that the first data is scheduled for storage in the memory device, a request to configure a first memory die (e.g., the first memory die 260-1 of FIG. 2) of the plurality of memory dies to operate in a first mode, where the first memory die is configured to have a first characteristic associated with the first set of performance criteria based on the request—e.g., as described herein, including with reference to the operations described at 425 of FIG. 4.

At 815, the method may include storing the first data using the first memory die based on the first data being associated with the first set of performance criteria and the first memory die having the first characteristic associated with the first set of performance criteria. The operations of 815 may be performed in accordance with examples as disclosed herein. For example, the host device may include a die selection component 635 that stores the first data using the first memory die based on the first data being associated with the first set of performance criteria and the first memory die having the first characteristic associated with the first set of performance criteria—e.g., as described herein, including with reference to the operations described at 435 of FIG. 4.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 18: A method, apparatus, or non-transitory computer-readable medium including operations, features, circuitry, logic, means, or instructions, or any combination thereof for determining that first data associated with a first set of performance criteria is scheduled for storage in a memory device including a plurality of memory dies; transmitting, to the memory device based on determining that the first data is scheduled for storage in the memory device, a request to configure a first memory die of the plurality of memory dies to operate in a first mode, where the first memory die is configured to have a first characteristic associated with the first set of performance criteria based on the request; and storing the first data using the first memory die based on the first data being associated with the first set of performance criteria and the first memory die having the first characteristic associated with the first set of performance criteria.

Aspect 19: The method, apparatus, or non-transitory computer-readable medium of aspect 18, further including operations, features, circuitry, logic, means, or instructions, or any combination thereof for determining that second data associated with a second set of performance criteria is scheduled for storage in the memory device; transmitting, to the memory device based on determining that the second data is scheduled for storage in the memory device, a second request to configure the first memory die to operate in a second mode, where the first memory die is configured to have a second characteristic associated with the second set of performance criteria based on the second request; and storing the second data using the first memory die based on the second data being associated with the second set of performance criteria and the first memory die having the second characteristic associated with the second set of performance criteria.

Aspect 20: The method, apparatus, or non-transitory computer-readable medium of any of aspects 18 through 19, further including operations, features, circuitry, logic, means, or instructions, or any combination thereof for determining that second data associated with a second set of performance criteria is scheduled for storage in the memory device; transmitting, to the memory device based on determining that the second data is scheduled for storage in the memory device, a second request to configure a second memory die of the plurality of memory dies to operate in a second mode, where the second memory die is configured to have a second characteristic associated with the second set of performance criteria based on the second request; and storing the second data using the second memory die based on the first memory die having the second characteristic associated with the second set of performance criteria.

Aspect 21: The method, apparatus, or non-transitory computer-readable medium of any of aspects 18 through 20, further including operations, features, circuitry, logic, means, or instructions, or any combination thereof for transmitting, to the memory device, a mode register set command for setting a frequency for the first memory die to a first frequency, where the first memory die has the first characteristic based on modifying the frequency for the first memory die.

Aspect 22: The method, apparatus, or non-transitory computer-readable medium of any of aspects 18 through 21, further including operations, features, circuitry, logic, means, or instructions, or any combination thereof for transmitting, to the memory device, a mode register set command for setting a supply voltage for the first memory die to a first voltage level, where the first memory die has the first characteristic based on modifying the supply voltage for the first memory die.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 23: An apparatus, including: a memory device including a plurality of memory dies; and a controller coupled with the memory device and configured to cause the apparatus to: program a first memory die of the plurality of memory dies to have a first characteristic associated with a first set of performance criteria; receive, based on programming the first memory die to have the first characteristic, first data associated with the first set of performance criteria; and store the first data using the first memory die based on the first memory die having the first characteristic associated with the first set of performance criteria.

Aspect 24: The apparatus of aspect 23, where the controller is further configured to cause the apparatus to: program, after programming the first memory die to have the first characteristic, the first memory die to have second characteristic associated with a second set of performance criteria; receive, based on programming the first memory die to have the second characteristic, second data associated with the second set of performance criteria; and store the second data using the first memory die based on the first memory die having the second characteristic associated with the second set of performance criteria.

An apparatus is described. The following provides an overview of aspects of the apparatus as described herein:

Aspect 25: An apparatus, including: a controller configured to cause the apparatus to: determine that first data associated with a first set of performance criteria is scheduled for storage in a memory device including a plurality of memory dies; transmit, to the memory device based on determining that the first data is scheduled for storage in the memory device, a request to configure a first memory die of the plurality of memory dies to operate in a first mode, where the first memory die is configured to have a first characteristic associated with the first set of performance criteria based on the request; and store the first data using the first memory die based on the first memory die having the first characteristic associated with the first set of performance criteria.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, from a host device, a first request to operate in a first mode;

modifying, based on the first request, first trim parameters for a first memory die of a plurality of memory dies in a memory device by setting a first combination of latches of a plurality of internal latches of the first memory die, wherein setting the first combination of latches causes the first memory die to have a first characteristic associated with a first set of performance criteria, and wherein setting the first combination of latches is based on one or more manufacture variation characteristics of the first memory die determined during a testing procedure;

programming the first memory die to have the first characteristic associated with the first set of performance criteria based on modifying the first trim parameters;

receiving, based on programming the first memory die to have the first characteristic, first data associated with the first set of performance criteria;

storing the first data using the first memory die based on the first data being associated with the first set of performance criteria and the first memory die having the first characteristic associated with the first set of performance criteria, wherein storing the first data using the first memory die comprises storing the first data using a first rank of the memory device that includes the first memory die based on the first rank being configured for the first set of performance criteria; and storing second data using a second rank of the memory device that includes a second memory die of the plurality of memory dies based on the second data being associated with a second set of performance criteria and the second rank being configured for the second set of performance criteria, wherein the second data is associated with the second set of performance criteria.

2. The method of claim 1, further comprising:

programming, after programming the first memory die to have the first characteristic, the first memory die to have a second characteristic associated with a third set of performance criteria;

receiving, based on programming the first memory die to have the second characteristic, third data associated with the third set of performance criteria; and storing the third data using the first memory die based on the third data being associated with the third set of performance criteria and the first memory die having the second characteristic associated with the third set of performance criteria.

3. The method of claim 2, further comprising:

receiving, from the host device, a second request to configure the first memory die to operate in a second mode, wherein the first memory die is programmed to have the second characteristic based on the second request.

4. The method of claim 1, further comprising:

programming, after programming the first memory die to have the first characteristic, the second memory die of the plurality of memory dies to have a second characteristic associated with a third set of performance criteria;

receiving, based on programming the second memory die to have the second characteristic, third data associated with the third set of performance criteria; and storing the third data using the second memory die based on the third data being associated with the third set of performance criteria and the second memory die having the second characteristic associated with the third set of performance criteria.

5. The method of claim 1, wherein:

the first memory die has the first characteristic based on modifying the first trim parameters, and the first memory die is configured to operate in the first mode within a duration for modifying the first trim parameters.

6. The method of claim 5, wherein the first mode comprises a high-performance mode, a nominal-performance mode, a reduced-performance mode, or a power-efficient mode.

7. The method of claim 1, further comprising:

receiving, from the host device, a mode register set command indicating an operating mode; and modifying, in response to the mode register set command, a frequency for the first memory die to a first frequency level based on the operating mode indicated in the mode register set command, wherein the first memory die has the first characteristic based on modifying the frequency for the first memory die.

8. The method of claim 1, further comprising:

receiving, from the host device, a mode register set command indicating an operating mode; and modifying, in response to the mode register set command, a supply voltage for the first memory die to a first voltage level based on the operating mode indicated in the mode register set command, wherein the first memory die has the first characteristic based on modifying the supply voltage for the first memory die.

9. The method of claim 1, wherein:

the first characteristic of the first memory die indicates that the first memory die is of a first type that is preferred for the first set of performance criteria; and a second characteristic of the second memory die indicates that the second memory die is of a second type that is preferred for the second set of performance criteria.

10. The method of claim 1, wherein the first set of performance criteria comprises a high processing load scenario, a high bandwidth scenario, a low power scenario, a nominal processing load scenario, or a reduced processing load scenario.

11. The method of claim 1, wherein:

the first memory die is used to store the first data instead of the second memory die of the plurality of memory dies based on the first memory die having the first characteristic and the second memory die having a second characteristic, and the second memory die is used to store the second data instead of the first memory die based on the second memory die having the second characteristic and the first memory die having the first characteristic.

12. A method, comprising:

determining, based on detecting an operating mode at a host device, that first data associated with a first set of performance criteria is scheduled for storage in a memory device comprising a plurality of memory dies;

transmitting, to the memory device based on determining that the first data is scheduled for storage in the memory device, a request to configure a first memory die of the plurality of memory dies to operate in a first mode based on programming one or more individual characteristics of the first memory die, wherein the first mode is based on the operating mode detected at the host device and on one or more manufacturing variation characteristics of the first memory die determined during a testing procedure, and wherein the first memory die is configured to have a first characteristic associated with the first set of performance criteria based on the request;

storing the first data using the first memory die based on the first data being associated with the first set of performance criteria and the first memory die having the first characteristic associated with the first set of performance criteria, wherein storing the first data using the first memory die comprises storing the first data using a first rank of the memory device that includes the first memory die based on the first rank being configured for the first set of performance criteria; and storing second data using a second rank of the memory device that includes a second memory die of the plurality of memory dies based on the second data being associated with a second set of performance criteria and the second rank being configured for the second set of performance criteria, wherein the second data is associated with the second set of performance criteria.

13. The method of claim 12, further comprising:

determining that third data associated with a third set of performance criteria is scheduled for storage in the memory device;

transmitting, to the memory device based on determining that the third data is scheduled for storage in the memory device, a second request to configure the first memory die to operate in a second mode, wherein the first memory die is configured to have a second characteristic associated with the third set of performance criteria based on the second request; and storing the third data using the first memory die based on the third data being associated with the third set of performance criteria and the first memory die having the second characteristic associated with the third set of performance criteria.

14. The method of claim 12, further comprising:

determining that third data associated with a third set of performance criteria is scheduled for storage in the memory device;

transmitting, to the memory device based on determining that the third data is scheduled for storage in the memory device, a second request to configure the second memory die of the plurality of memory dies to operate in a second mode, wherein the second memory die is configured to have a second characteristic associated with the third set of performance criteria based on the second request; and storing the third data using the second memory die based on the second memory die having the second characteristic associated with the third set of performance criteria.

15. The method of claim 12, further comprising:

transmitting, to the memory device, a mode register set command for setting a frequency for the first memory die to a first frequency, wherein the first memory die has the first characteristic based on modifying the frequency for the first memory die.

16. The method of claim 12, further comprising:

transmitting, to the memory device, a mode register set command for setting a supply voltage for the first memory die to a first voltage level, wherein the first memory die has the first characteristic based on modifying the supply voltage for the first memory die.

17. An apparatus, comprising:
a memory device comprising a plurality of memory dies; and
a controller coupled with the memory device and configured to cause the apparatus to:
receive, from a host device, a first request to operate in a first mode;
modify, based on the first request, first trim parameters for a first memory die of the plurality of memory dies by setting a first combination of latches of a plurality of internal latches of the first memory die, wherein setting the first combination of latches causes the first memory die to have a first characteristic associated with a first set of performance criteria, and wherein setting the first combination of latches is based on one or more manufacture variation characteristics of the first memory die determined during a testing procedure;
program the first memory die of the plurality of memory dies to have the first characteristic associated with the first set of performance criteria based on modifying the first trim parameters;
receive, based on programming the first memory die to have the first characteristic, first data associated with the first set of performance criteria;
store the first data using the first memory die based on the first memory die having the first characteristic associated with the first set of performance criteria, wherein the first data is stored using a first rank of the memory device that includes the first memory die based on the first rank being configured for the first set of performance criteria; and
store second data using a second rank of the memory device that includes a second memory die of the plurality of memory dies based on the second data being associated with a second set of performance criteria and the second rank being configured for the second set of performance criteria, wherein the second data is associated with the second set of performance criteria.

18. The apparatus of claim 17, wherein the controller is further configured to cause the apparatus to:
program, after programming the first memory die to have the first characteristic, the first memory die to have a second characteristic associated with a third set of performance criteria;
receive, based on programming the first memory die to have the second characteristic, third data associated with the third set of performance criteria; and
store the third data using the first memory die based on the first memory die having the second characteristic associated with the third set of performance criteria.

19. The apparatus of claim 18, wherein the controller is further configured to cause the apparatus to:
receive, from the host device, a second request to configure the first memory die to operate in a second mode, wherein the first memory die is programmed to have the second characteristic based on the second request.

20. The apparatus of claim 17, wherein the controller is further configured to cause the apparatus to:
program, after programming the first memory die to have the first characteristic, the second memory die of the plurality of memory dies to have a second characteristic associated with a third set of performance criteria;
receive, based on programming the second memory die to have the second characteristic, third data associated with the third set of performance criteria; and
store the third data using the second memory die based on the third data being associated with the third set of performance criteria and the second memory die having the second characteristic associated with the third set of performance criteria.

* * * * *